(12) United States Patent
Jimenez, III et al.

(10) Patent No.: US 11,758,306 B2
(45) Date of Patent: Sep. 12, 2023

(54) CABLING-BASED AIRFLOW ROUTING SYSTEM

(71) Applicant: Dell Products L.P., Round Rock, TX (US)

(72) Inventors: Salvador Jimenez, III, Leander, TX (US); Noman Mithani, Fairview, TX (US); William Andrew Smith, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 694 days.

(21) Appl. No.: 16/936,751

(22) Filed: Jul. 23, 2020

(65) Prior Publication Data
US 2022/0030331 A1   Jan. 27, 2022

(51) Int. Cl.
*H04Q 1/14*   (2006.01)
(52) U.S. Cl.
CPC ............. *H04Q 1/141* (2013.01); *H04Q 1/142* (2013.01); *H04Q 2201/10* (2013.01)

(58) Field of Classification Search
CPC ...... H04Q 1/141; H04Q 1/142; H04Q 2201/10
USPC ........................................................ 174/60
IPC ............................ H04Q 1/141,1/142, 2201/10
See application file for complete search history.

(56) References Cited

U.S. PATENT DOCUMENTS

| | | | |
|---|---|---|---|
| 7,482,536 B2 * | 1/2009 | Marquardt | H02G 3/285 52/220.8 |
| 2007/0091564 A1 | 4/2007 | Malone et al. | |
| 2013/0215563 A1 * | 8/2013 | Behziz | G06F 1/183 361/728 |
| 2018/0120906 A1 * | 5/2018 | Reed | H05K 7/1487 |

* cited by examiner

*Primary Examiner* — Timothy J Thompson
*Assistant Examiner* — Michael F McAllister
(74) *Attorney, Agent, or Firm* — Joseph Mencher

(57) ABSTRACT

A cabling-based airflow routing system includes a chassis that defines a chassis housing. A first heat producing component is located in the chassis housing. A first cabling connector is located in the chassis housing. A second cabling connector that is located in the chassis housing. A first ribbon cable that extends through the chassis housing between the first cabling connector and the second cabling connector. The first ribbon cable includes a first cabling airflow routing portion that is oriented in the chassis housing in an airflow path and that is configured to redirect a first portion of an airflow provided in the airflow path towards the first heat producing component.

20 Claims, 12 Drawing Sheets

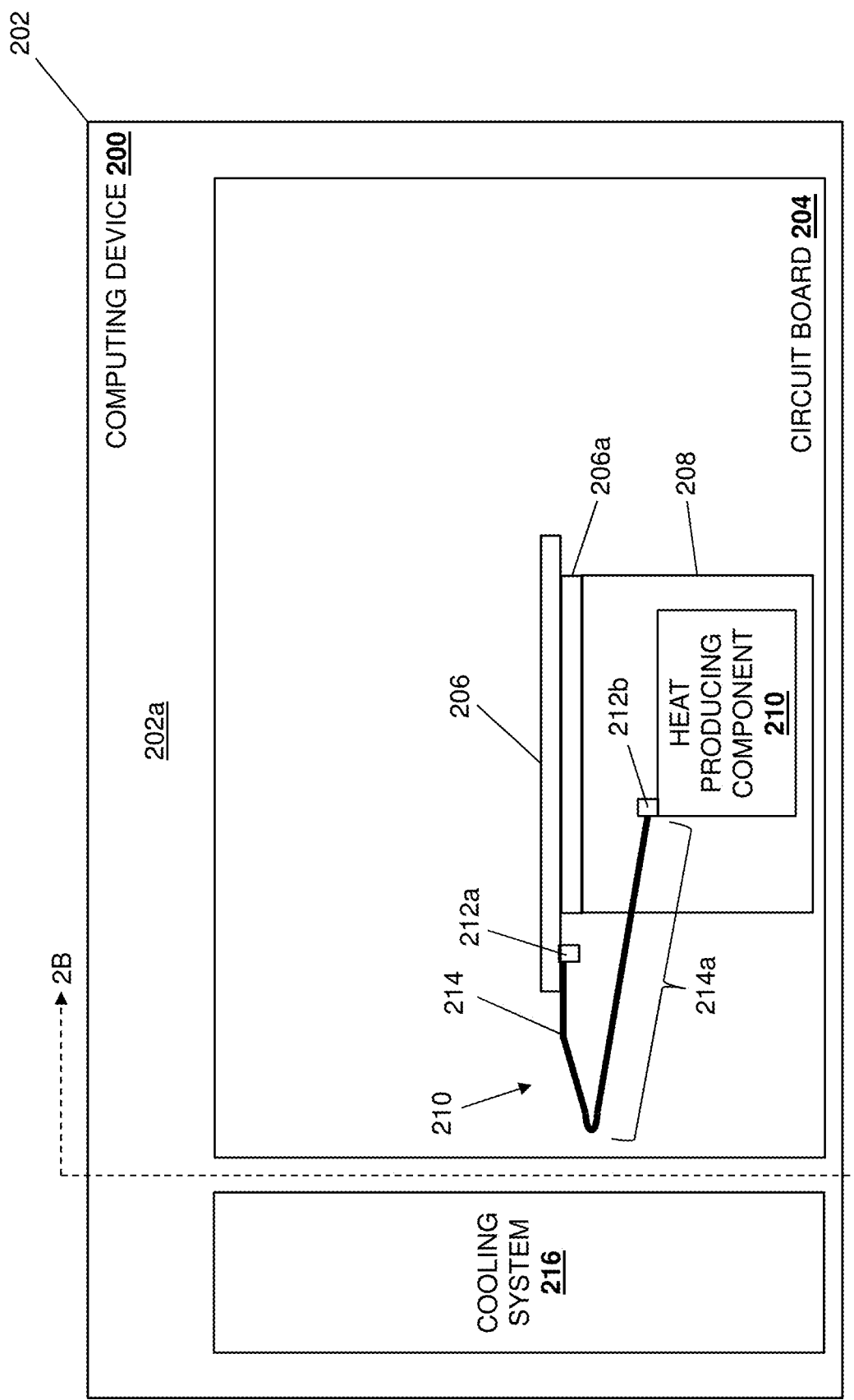

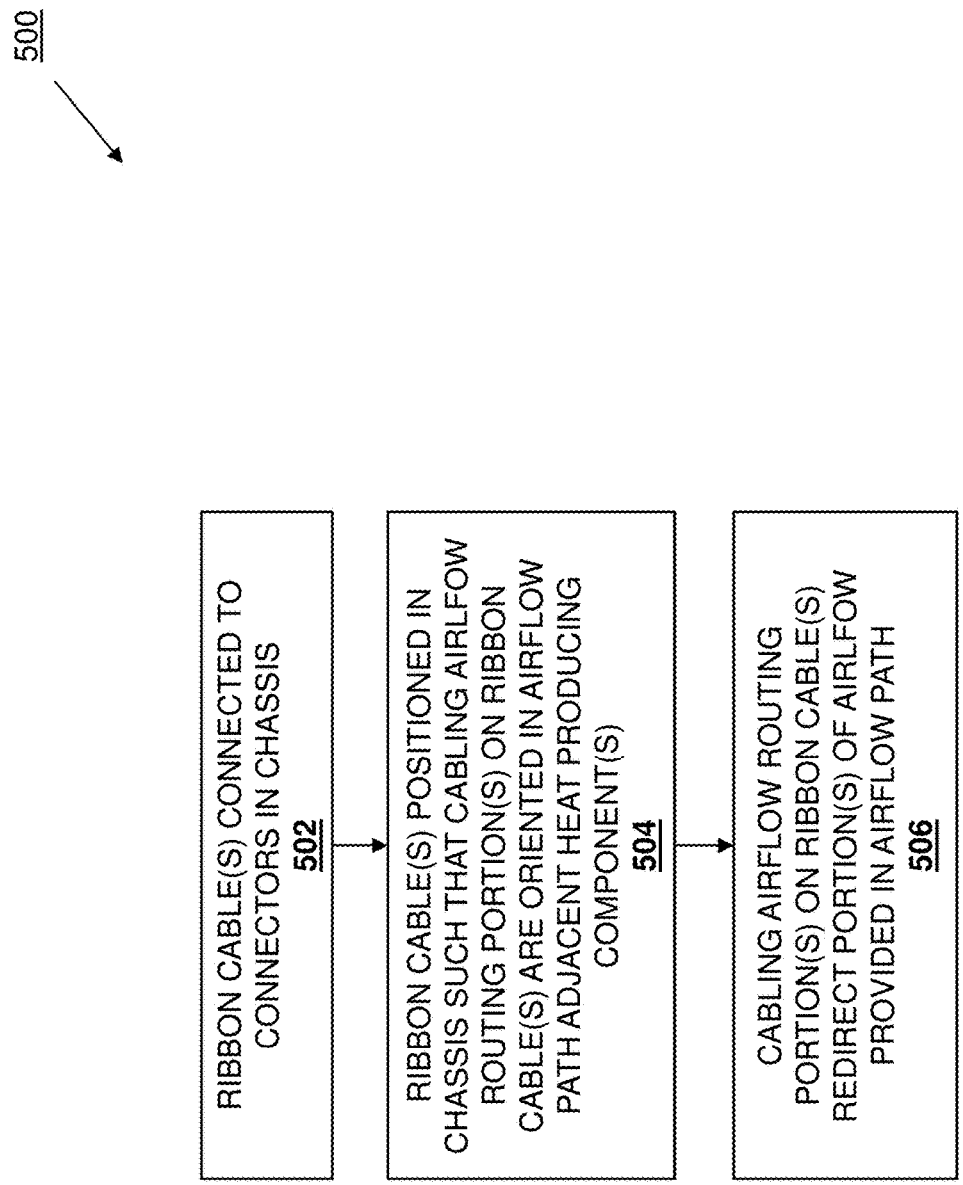

CABLING-BASED AIRFLOW ROUTING SYSTEM

BACKGROUND

The present disclosure relates generally to information handling systems, and more particularly to routing airflow via cabling provided in an information handling.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A trend in information handling systems such as, for example, server computing devices, desktop computing devices, laptop/notebook computing devices, tablet computing devices, mobile phones, and/or other computing devices known in the art, is the increased density of computing device components in the chassis of the computing device. However, as the density of computing device components in the chassis of computing devices increases, the airflow requirements needed to adequately cooling those computing device components requires deliberate airflow routing from cooling systems in the computing device to those computing device components in order to maximize thermal efficiencies of the computing device while meeting its thermal requirements. In conventional computing devices, computing device airflow requirements (e.g., Cubic Feet per Minute (CFM) airflow requirements for computing device component(s)) may be satisfied by the use of static air ducts systems that are provided by molded plastic structures having airflow routing surfaces that are designed to redirect airflow created by the cooling system towards the computing device components that require that airflow. However, such static air duct systems must be designed for particular computing device configurations (i.e., computing devices with computing device components located in particular locations within the chassis) and, when airflow requirements change, new air duct systems must be created (e.g., requiring tooling changes to the air duct system manufacturing systems to create the new air duct systems), computing device configurations must be modified to accommodate the new air duct systems, and/or other steps must be taken that require time and introduce additional costs (scrap costs, service stock costs, factory implementation costs, etc.)

Accordingly, it would be desirable to provide an airflow routing system that addresses the issues discussed above.

SUMMARY

According to one embodiment, an Information Handling System (IHS) includes a chassis; a processing system that is housed in the chassis; and a memory system that is housing in the chassis, that is coupled to the processing system, and that includes instructions that, when executed by the processing system, cause the processing system to perform at least one computing operation; and a first ribbon cable that extends through the chassis, wherein the first ribbon cable includes a first cabling airflow routing portion that is oriented in the chassis in an airflow path and that is configured to redirect a first portion of an airflow provided in the airflow path towards the processing system.

BRIEF DESCRIPTION OF THE DRAWINGS

FIG. 2A is a top schematic view illustrating an embodiment of a computing device including a cabling-based airflow routing system according to the teachings of the present disclosure.

FIG. 5 is a flow chart illustrating an embodiment of a method for routing airflow using cabling.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
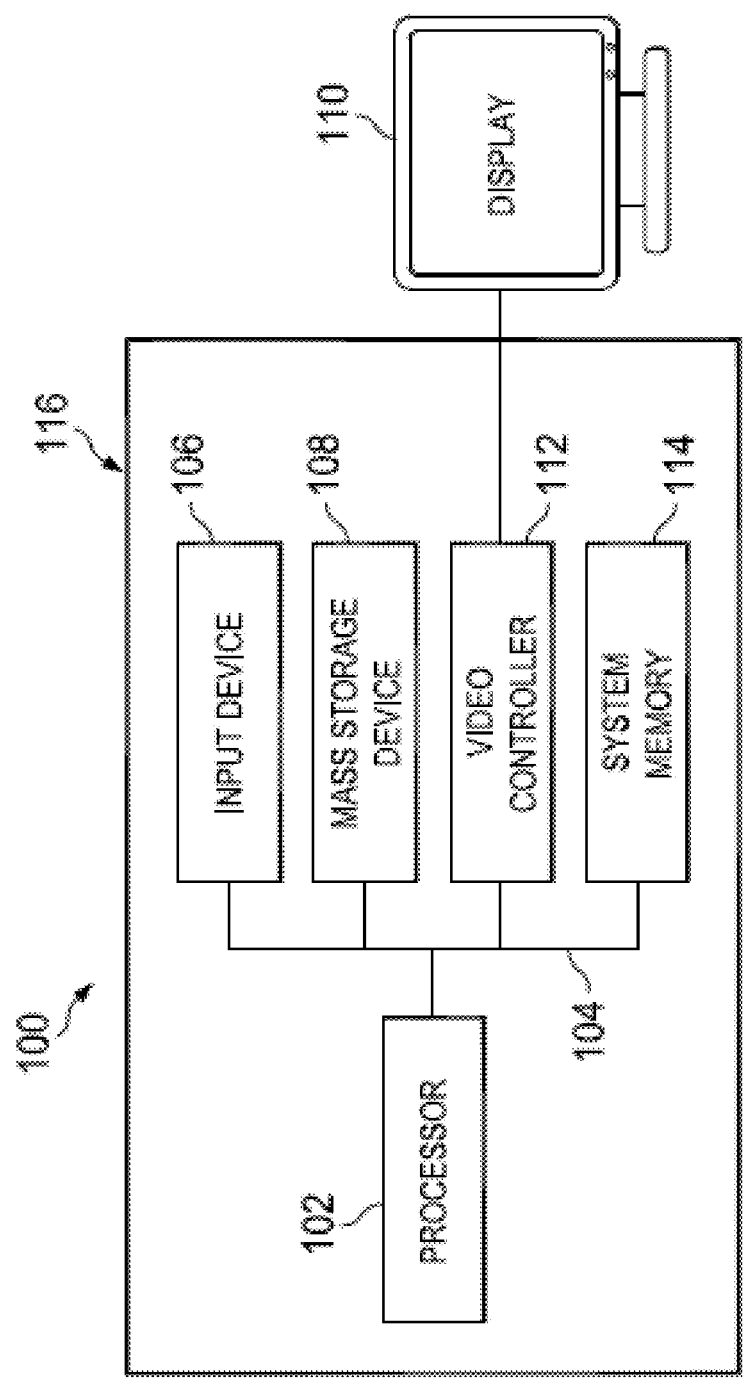
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2B:
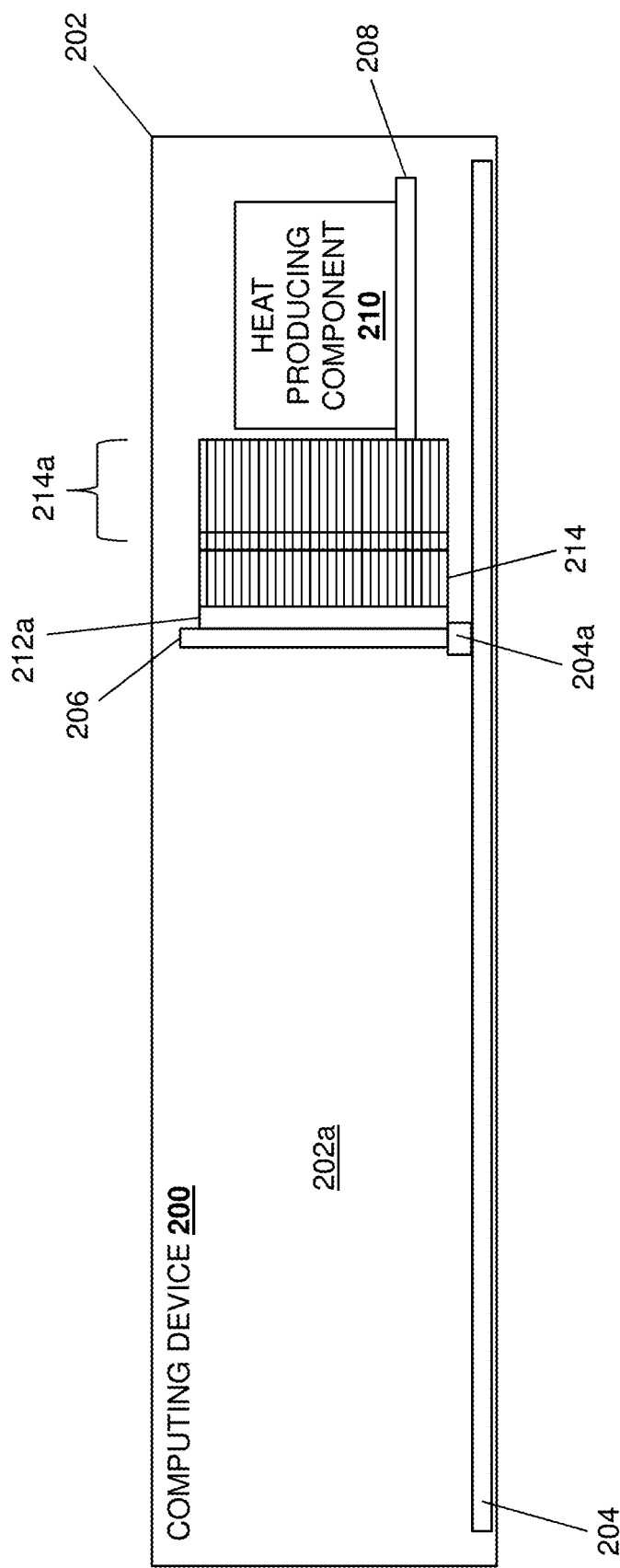
FIG. 2B is a cross-sectional schematic view illustrating an embodiment of the computing device of FIG. 2A along line 2B-2B.

Referring now to FIGS. 2A and 2B, an embodiment of a computing device 200 is illustrated that utilizes the cabling-based airflow routing system of the present disclosure. In an embodiment, the computing device 200 may be provided by the IHS 100 discussed above with reference to FIG. 1 and/or may include some or all of the components of the IHS 100. Furthermore, while one of skill in the art in possession of the present disclosure will recognize that the computing device 200 is illustrated and discussed as being provided by a server computing device, one of skill in the art in possession of the present disclosure will recognize that the functionality of the computing device 200 discussed below may be provided by desktop computing devices, laptop/notebook computing devices, table computing devices, mobile phones, and/or other computing devices that are configured to operate similarly as the computing device 200 discussed below. In the illustrated embodiment, the computing device 200 includes a chassis 202 that defines a chassis housing 202a that houses the components of the computing device 200, only some of which are illustrated below.

In the illustrated embodiment, a circuit board 204 is located in the chassis housing 202a, and one of skill in the art in possession of the present disclosure will recognize that the circuit board 204 may be provided by a motherboard, although other circuit boards will fall within the scope of the present disclosure as well. In the example illustrated in FIGS. 2A and 2B, the circuit board 204 includes a riser connector 204a that is mounted to the circuit board 204, and a riser card 206 is connected to the riser connector 204a in order to connect the riser card 206 to the circuit board 204. As will be appreciated by one of skill in the art in possession of the present disclosure, the riser card 206 may be provided by a variety of circuit boards known in the art. The riser card 206 includes an expansion card connector 206a, and an expansion card 208 is connected to the expansion card connector 206a in order to connect the expansion card 208 to the circuit board 204 via the riser card 206. As will be appreciated by one of skill in the art in possession of the present disclosure, the expansion card 208 may be provided by a variety of circuit boards known in the art.

In the illustrated embodiment, a heat producing component 210 is mounted to the expansion card 208. For example, the heat producing component 210 may be provided by a processing system (e.g., the processor 102 discussed above with reference to FIG. 1). While not illustrated in FIGS. 2A and 2B, a memory system (not illustrated, but which may include the memory 114 discussed above with reference to FIG. 1) may be included in the chassis 202 (e.g., mounted to the circuit board 204, mounted to the expansion card 208, etc.), coupled to the processing system, and may include instructions that, when executed by the processing system, cause the processing system to perform a variety of computing operations that would be apparent to one of skill in the art in possession of the present disclosure. However, while a specific heat producing component has been described, one of skill in the art in possession of the present disclosure will recognize that the heat producing component 210 may be provided by a variety of heat producing components known in the art while remaining within the scope of the present disclosure as well.

In the illustrated embodiment, a cabling subsystem 210 is housed in the chassis housing 202a, and includes a first cabling connector 212a that is mounted to the riser card 206, a second cabling connector 212b that is coupled to the heat producing component 210, and a ribbon cable 214 that is connected to each of the first cabling connector 212a and the second cabling connector 212b. The ribbon cable 214 extends through the chassis housing 202a and, as illustrated in FIGS. 2A and 2B, the ribbon cable 214 has been oriented within the chassis housing 202a such that a first cabling airflow routing portion 214a of the ribbon cable 214 is positioned within the chassis housing 202a in a manner that, as discussed below, provides the first cabling airflow routing portion 214a of the ribbon cable 214 in an airflow path such that the first cabling airflow routing portion 214a of the ribbon cable 214 may redirect a portion of an airflow provided in that airflow path towards the heat producing component 210. In a specific example, the ribbon cable 214 may be a ribbonized, High Speed Input/Output (HSIO) cable that includes a plurality of wires that are configured to transmit data between components in the computing device 200 (e.g., via the first cabling connector 212a and the second cabling connector 212b), and that are provided in a ribbon structure that, as illustrated in FIGS. 2A and 2B, may include a relatively flat, relatively wide multi-wire cable. However, while a specific example of the ribbon cable 214 is illustrated and described, one of skill in the art in possession of the present disclosure will recognize that other cabling with similar features may be utilized to provide the cabling-based airflow routing functionality of the present disclosure while remaining within its scope.

In the illustrated embodiment, the chassis housing 202a houses a cooling system 216 that is configured to provide the airflow along an airflow path in the chassis housing 202a that, as discussed below, moves left to right in FIG. 2A and into the page in FIG. 2B. In a specific example, the cooling system 216 may be provided by a fan system including a plurality of fan devices, although one of skill in the art in possession of the present disclosure will recognize that cooling systems may include a variety of cooling components that will fall within the scope of the present disclosure as well. Furthermore, while a cooling system is illustrated and discussed as being provided in the chassis housing 202a, one of skill in the art in possession of the present disclosure will recognize that cooling systems may be provided outside of the chassis 202, and/or airflows may be provided through the chassis housing 202a in a variety of manners that will fall within the scope of the present disclosure as well. As such, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the functionality discussed below, while remaining within the scope of the present disclosure as well.

Figure 3A:
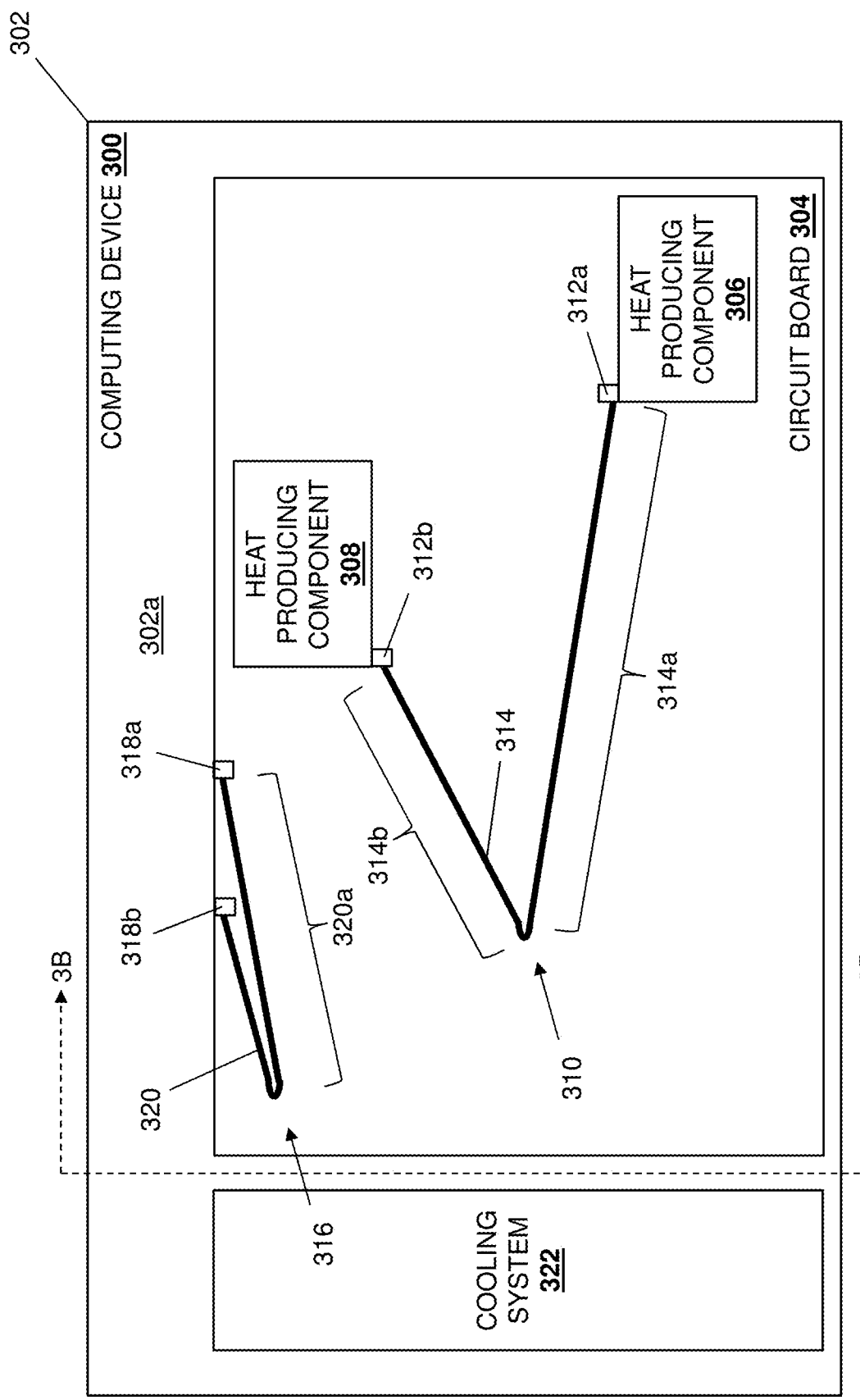
FIG. 3A is a top schematic view illustrating an embodiment of a computing device including a cabling-based airflow routing system according to the teachings of the present disclosure.
Figure 3B:
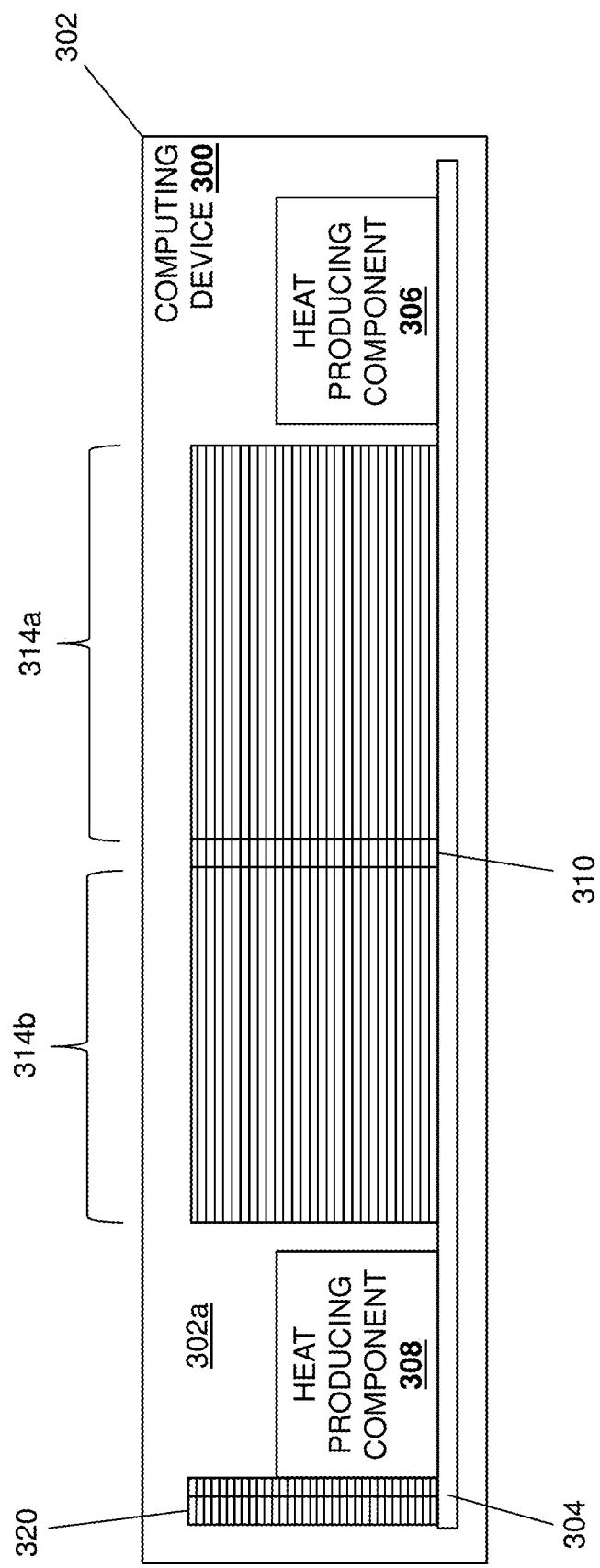
FIG. 3B is a cross-sectional schematic view illustrating an embodiment of the computing device of FIG. 3A along line 3B-3B.

Referring now to FIGS. 3A and 3B, an embodiment of a computing device 300 is illustrated that utilizes the cabling-based airflow routing system of the present disclosure. In an embodiment, the computing device 300 may be provided by the IHS 100 discussed above with reference to FIG. 1 and/or may include some or all of the components of the IHS 100. Furthermore, while one of skill in the art in possession of the present disclosure will recognize that the computing device 300 is illustrated and discussed as being provided by a server computing device, one of skill in the art in possession of the present disclosure will recognize that the functionality of the computing device 300 discussed below may be provided by desktop computing devices, laptop/notebook computing devices, table computing devices, mobile phones, and/or other computing devices that are configured to operate similarly as the computing device 300 discussed below. In the illustrated embodiment, the computing device 300 includes a chassis 302 that defines a chassis housing 302a that houses the components of the computing device 300, only some of which are illustrated below.

In the illustrated embodiment, a circuit board 304 is located in the chassis housing 302a, and one of skill in the art in possession of the present disclosure will recognize that the circuit board 304 may be provided by a motherboard, although other circuit boards will fall within the scope of the present disclosure as well. In the example illustrated in FIGS. 3A and 3B, the circuit board 304 includes a pair of heat producing components 306 and 308 that are mounted to the circuit board 304. For example, the heat producing component 306 may be provided by a processing system (e.g., but which may include the processor 102 discussed above with reference to FIG. 1), and the heat producing component 308 may be provided by a memory system (e.g., which may include the memory 114 discussed above with reference to FIG. 1) that is coupled to the processing system, and that includes instructions that, when executed by the processing system, cause the processing system to perform a variety of computing operations that would be apparent to one of skill in the art in possession of the present disclosure. However, while specific heat producing components have been described, one of skill in the art in possession of the present disclosure will recognize that the heat producing components 306 and 308 may be provided by a variety of heat producing components known in the art while remaining within the scope of the present disclosure as well.

In the illustrated embodiment, a cabling subsystem 310 is housed in the chassis housing 302a, and includes a first cabling connector 312a that is coupled to the heat producing component 306, a second cabling connector 312b that is coupled to the heat producing component 308, and a ribbon cable 314 that is connected to each of the first cabling connector 312a and the second cabling connector 312b. The ribbon cable 314 extends through the chassis housing 302a and, as illustrated in FIGS. 3A and 3B, the ribbon cable 314 has been oriented within the chassis housing 302a such that a first cabling airflow routing portion 314a of the ribbon cable 314 is positioned within the chassis housing 302a in a manner that provides the first cabling airflow routing portion 314a of the ribbon cable 314 in an airflow path such that the first cabling airflow routing portion 314a of the ribbon cable 314 may redirect a first portion of an airflow provided in that airflow path towards the heat producing component 306, and a second cabling airflow routing portion 314b of the ribbon cable 314 is positioned within the chassis housing 302a in a manner that provides the second cabling airflow routing portion 314b of the ribbon cable 314 in an airflow path such that the second cabling airflow routing portion 314b of the ribbon cable 314 may redirect a second portion of the airflow provided in that airflow path towards the heat producing component 306, as discussed in further detail below.

Furthermore, in the illustrated embodiment, a cabling subsystem 316 is housed in the chassis housing 302a, and includes a first cabling connector 318a that is mounted to the circuit board 304, a second cabling connector 318b that is mounted to the circuit board 304, and a ribbon cable 316 that is connected to each of the first cabling connector 318a and the second cabling connector 318b. The ribbon cable 320 extends through the chassis housing 302a and, as illustrated in FIGS. 3A and 3B, the ribbon cable 320 has been oriented within the chassis housing 302a such that a cabling airflow routing portion 320a of the ribbon cable 320 is positioned within the chassis housing 302a in a manner that provides the cabling airflow routing portion 320a of the ribbon cable 320 in the airflow path such that the cabling airflow routing portion 320a of the ribbon cable 320 may redirect a third portion of the airflow provided in that airflow path towards the heat producing component 308, as discussed in further detail below. In a specific example, the ribbon cables 314 and 320 may each be ribbonized, High Speed Input/Output (HSIO) cables that each include a plurality of wires that are configured to transmit data between components in the computing device 300 (e.g., via the first cabling connector 312a and the second cabling connector 312b, and via the first cabling connector 318a and the second cabling connector 318b), and that are provided in a ribbon structure that, as illustrated in FIGS. 3A and 3B, may include a relatively flat, relatively wide multi-wire cable. However, while a specific example of the ribbon cables 314 and 320 is illustrated and described, one of skill in the art in possession of the present disclosure will recognize that other cabling with similar features may be utilized to provide the cabling-based airflow routing functionality of the present disclosure while remaining within its scope.

In the illustrated embodiment, the chassis housing 302a houses a cooling system 322 that is configured to provide the airflow along the airflow path in the chassis housing 302a that, as discussed below, moves left to right in FIG. 3A and into the page in FIG. 3B. In a specific example, the cooling system 322 may be provided by a fan system including a plurality of fan devices, although one of skill in the art in possession of the present disclosure will recognize that cooling systems may include a variety of cooling components that will fall within the scope of the present disclosure as well. Furthermore, while a cooling system is illustrated and discussed as being provided in the chassis housing 302a, one of skill in the art in possession of the present disclosure will recognize that cooling systems may be provided outside of the chassis 302, and/or airflows may be provided through the chassis housing 302a in a variety of manners that will fall within the scope of the present disclosure as well. As such, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4A:
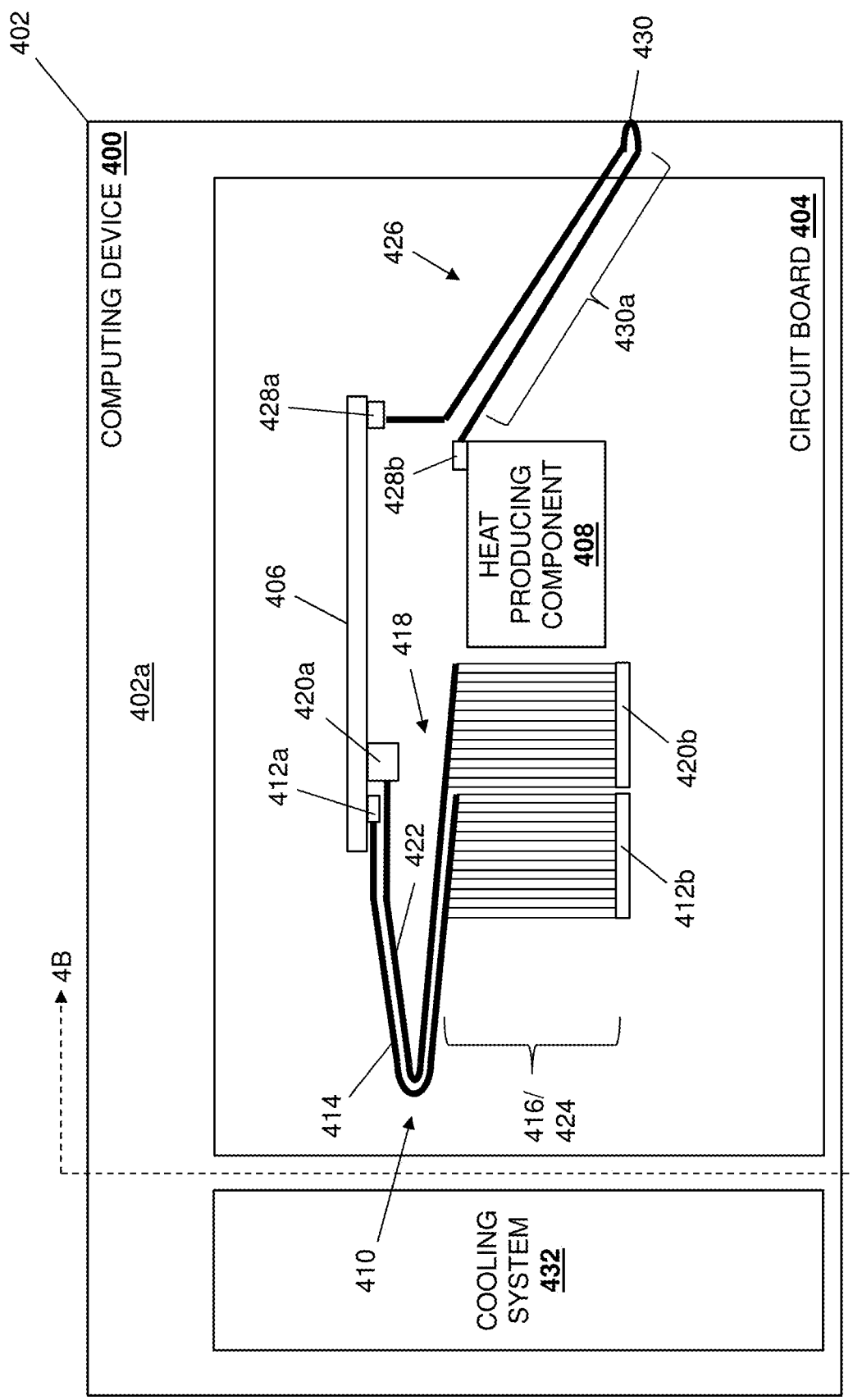
FIG. 4A is a top schematic view illustrating an embodiment of a computing device including a cabling-based airflow routing system according to the teachings of the present disclosure.
Figure 4B:
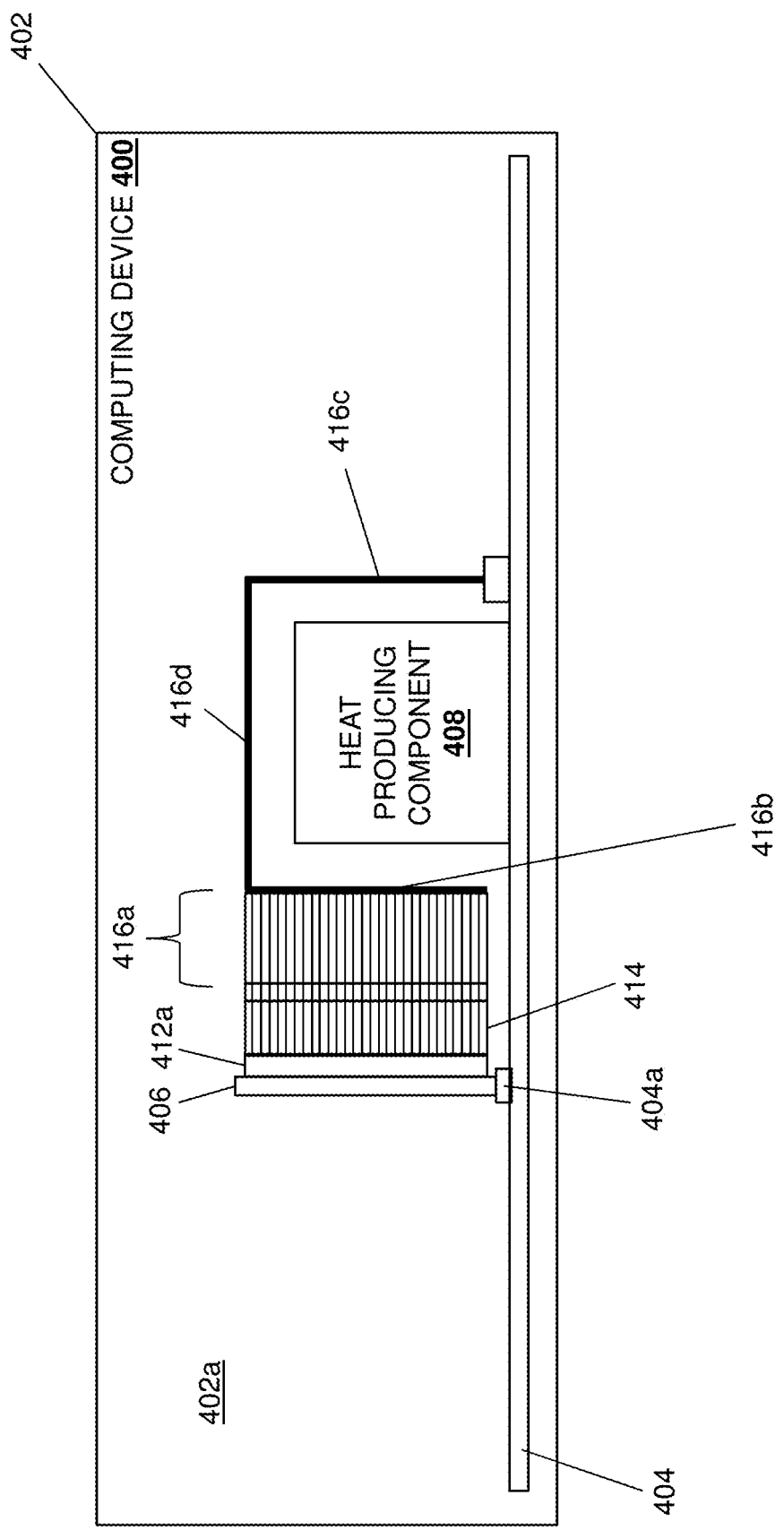
FIG. 4B is a cross-sectional schematic view illustrating an embodiment of the computing device of FIG. 2A along line 4B-4B.

Referring now to FIGS. 4A and 4B, an embodiment of a computing device 400 is illustrated that utilizes the cabling-based airflow routing system of the present disclosure. In an embodiment, the computing device 200 may be provided by the IHS 100 discussed above with reference to FIG. 1 and/or may include some or all of the components of the IHS 100. Furthermore, while one of skill in the art in possession of the present disclosure will recognize that the computing device 400 is illustrated and discussed as being provided by a server computing device, one of skill in the art in possession of the present disclosure will recognize that the functionality of the computing device 400 discussed below may be provided by desktop computing devices, laptop/notebook computing devices, table computing devices, mobile phones, and/or other computing devices that are configured to operate similarly as the computing device 400 discussed below. In the illustrated embodiment, the computing device 400 includes a chassis 402 that defines a chassis housing 402a that houses the components of the computing device 400, only some of which are illustrated below.

In the illustrated embodiment, a circuit board 404 is located in the chassis housing 402a, and one of skill in the art in possession of the present disclosure will recognize that the circuit board 404 may be provided by a motherboard, although other circuit boards will fall within the scope of the present disclosure as well. In the example illustrated in FIGS. 4A and 4B, the circuit board 404 includes a riser connector 404a that is mounted to the circuit board 404, and a riser card 406 is connected to the riser connector 404a in order to connect the riser card 406 to the circuit board 404. As will be appreciated by one of skill in the art in possession of the present disclosure, the riser card 406 may be provided by a variety of circuit boards known in the art.

In the illustrated embodiment, a heat producing component 408 is mounted to the circuit board 404. For example, the heat producing component 408 may be provided by a processing system (e.g., but which may include the processor 102 discussed above with reference to FIG. 1). While not illustrated in FIGS. 4A and 4B, a memory system (not illustrated, but which may include the memory 114 dis- cussed above with reference to FIG. 1) may be included in the chassis 402 (e.g., mounted to the circuit board 404, etc.), coupled to the processing system, and may include instructions that, when executed by the processing system, cause the processing system to perform a variety of computing operations that would be apparent to one of skill in the art in possession of the present disclosure. However, while a specific heat producing component has been described, one of skill in the art in possession of the present disclosure will recognize that the heat producing component 408 may be provided by a variety of heat producing components known in the art while remaining within the scope of the present disclosure as well.

In the illustrated embodiment, a cabling subsystem 410 is housed in the chassis housing 402a, and includes a first cabling connector 412a that is mounted to the riser card 406, a second cabling connector 412b that is mounted to the circuit board 404, and a ribbon cable 414 that is connected to each of the first cabling connector 412a and the second cabling connector 412b. The ribbon cable 414 extends through the chassis housing 402a and, as illustrated in FIGS. 4A and 4B, the ribbon cable 414 has been oriented within the chassis housing 402a such that a first cabling airflow routing portion 416 of the ribbon cable 414 is positioned within the chassis housing 402a in a manner that provides the first cabling airflow routing portion 416 of the ribbon cable 414 in an airflow path such that the first cabling airflow routing portion 416 of the ribbon cable 414 may redirect a portion of an airflow provided in that airflow path towards the heat producing component 408, as discussed in further detail below. As visible in FIG. 4B, the first cabling airflow routing portion 416 of the ribbon cable 414 includes an airflow routing wall 416a that is coupled to an airflow tunnel that is provided by the first cabling airflow routing portion 416 of the ribbon cable 414, that includes pair of substantially parallel side walls 416b and 416c connected by a top wall 416d, and that is located adjacent the heat producing component 408.

Furthermore, in the illustrated embodiment, a cabling subsystem 418 is housed in the chassis housing 402a, and includes a first cabling connector 420a that is mounted to the riser card 406, a second cabling connector 420b that is mounted to the circuit board 404, and a ribbon cable 422 that is connected to each of the first cabling connector 420a and the second cabling connector 420b. The ribbon cable 422 extends through the chassis housing 402a and, as illustrated in FIGS. 4A and 4B, the ribbon cable 422 has been oriented within the chassis housing 402a such that a first cabling airflow routing portion 424 of the ribbon cable 422 is positioned within the chassis housing 402a in a manner that provides the first cabling airflow routing portion 424 of the ribbon cable 422 in an airflow path such that the first cabling airflow routing portion 424 of the ribbon cable 422 may redirect a portion of an airflow provided in that airflow path towards the heat producing component 408, as discussed in further detail below. Similarly as discussed above with the first cabling airflow routing portion 416 of the ribbon cable 414, the first cabling airflow routing portion 422 of the ribbon cable 424 may include an airflow tunnel that is substantially similarly to the airflow tunnel provided by the first cabling airflow routing portion 416 of the ribbon cable 414 (e.g., including a pair of substantially parallel side walls connected by a top wall), and that is located adjacent between the heat producing component 408 and the airflow tunnel provided by the first cabling airflow routing portion 416 of the ribbon cable 414.

Further still, in the illustrated embodiment, a cabling subsystem 426 is housed in the chassis housing 402a, and includes a first cabling connector 428a that is mounted to the riser card 406, a second cabling connector 428b that is coupled to the heat producing component 408, and a ribbon cable 430 that is connected to each of the first cabling connector 428a and the second cabling connector 428b. The ribbon cable 430 extends through the chassis housing 402a and, as illustrated in FIGS. 4A and 4B, the ribbon cable 430 has been oriented within the chassis housing 402a such that a first cabling airflow routing portion 430a of the ribbon cable 430 is positioned within the chassis housing 402a in a manner that provides the first cabling airflow routing portion 430a of the ribbon cable 430 in an airflow path such that the first cabling airflow routing portion 430a of the ribbon cable 430 may redirect a portion of an airflow provided in that airflow path and past the heat producing component 408 out of the chassis housing 402a (e.g., via apertures in the chassis 402, not illustrated), as discussed in further detail below. In a specific example, the ribbon cables 414, 422, and 430 may each be ribbonized, High Speed Input/Output (HSIO) cables that each include a plurality of wires that are configured to transmit data between components in the computing device 400 (e.g., via the first cabling connector 412a and the second cabling connector 412b, via the first cabling connector 420a and the second cabling connector 420b, and via the first cabling connector 428a and the second cabling connector 428b), and that are provided in a ribbon structure that, as illustrated in FIGS. 4A and 4B, may include a relatively flat, relatively wide multi-wire cable. However, while a specific example of the ribbon cables 414, 422, and 430 is illustrated and described, one of skill in the art in possession of the present disclosure will recognize that other cabling with similar features may be utilized to provide the cabling-based airflow routing functionality of the present disclosure while remaining within its scope.

For example, in the illustrated embodiment, the chassis housing 402a houses a cooling system 432 that is configured to provide the airflow along the airflow path in the chassis housing 402a as discussed below. In a specific example, the cooling system 432 may be provided by a fan system including a plurality of fan devices, although one of skill in the art in possession of the present disclosure will recognize that cooling systems may include a variety of cooling components that will fall within the scope of the present disclosure as well. Furthermore, while a cooling system is illustrated and discussed as being provided in the chassis housing 402a, one of skill in the art in possession of the present disclosure will recognize that cooling systems may be provided outside of the chassis 402, and/or airflows may be provided through the chassis housing 402a in a variety of manners that will fall within the scope of the present disclosure as well. As such, while a specific computing device 400 has been illustrated and described, one of skill in the art in possession of the present disclosure will recognize that computing devices (or other devices operating according to the teachings of the present disclosure in a manner similar to that described below for the computing device 400) may include a variety of components and/or component configurations for providing conventional computing device functionality, as well as the functionality discussed below, while remaining within the scope of the present disclosure as well.

While some specific examples of the cabling-based airflow routing system of the present disclosure are illustrated and described herein with reference to FIGS. 2A, 2B, 3A, 3B, 4A, and 4B, one of skill in the art in possession of the present disclosure will recognize that the cabling subsystems of the present disclosure may be provided in a chassis in a variety of manners, routed through a chassis housing, and oriented in airflow paths in order to provide for the redirecting of airflows towards heat producing components described herein. As such, one of skill in the art in possession of the present disclosure will appreciate that the specific connections of the cabling subsystems to particular connectors, the coupling of the cabling subsystems to particular components, and/or other specific details illustrated and described herein may be combined, modified, and/or performed in other manners while providing the cabling-based airflow routing functionality described herein, and thus are envisioned as falling within the scope of the present disclosure as well.

Referring now to FIG. 5, an embodiment of a method 500 for routing airflow using cabling is illustrated. As discussed below, the systems and methods of the present disclosure provide for the routing of airflows through a chassis housing and to heat producing component(s) housed in the chassis using ribbon cable(s) that extend through the chassis housing and that are oriented such that cabling airflow routing portion(s) of the ribbon cable(s) redirect portion(s) of airflows provided on an airflow path towards the heat producing component(s). For example, the cabling-based airflow routing system of the present disclosure may include a chassis that defines a chassis housing, a first heat producing component that is located in the chassis housing, a first cabling connector that is located in the chassis housing, and a second cabling connector that is located in the chassis housing. A first ribbon cable extends through the chassis housing between the first cabling connector and the second cabling connector, and includes a first cabling airflow routing portion that is oriented in the chassis housing in an airflow path and that is configured to redirect a first portion of an airflow provided in the airflow path towards the first heat producing component. As such, the cabling subsystems utilized to connect components in a computing device in order to transmit data between those components may be utilized to route airflows, allowing airflow routing within the computing device to be adjusted and/or modified quickly and easily when needed, and eliminating the issues associated with conventional air duct systems when airflow requirements in the computing device change.

The method 500 begins at block 502 where ribbon cable(s) are connected to connectors in a chassis. In an embodiment, at block 502, a computing device implementing the cabling-based airflow routing system of the present disclosure may have its cabling subsystems coupled to components in the computing device. For example, with reference to the computing device 200 discussed above with reference to FIGS. 2A and 2B, the cabling subsystem 210 may be connected to the cabling connectors 212a and 212b in order to connect the heat producing component 210 to the circuit board 204 via the riser board 206. Similarly, with reference to the computing device 300 discussed above with reference to FIGS. 3A and 3B, the cabling subsystem 310 may be connected to the cabling connectors 312a and 312b in order to connect the heat producing component 306 to the heat producing component 308, and the cabling subsystem 316 may be connected to the cabling connectors 318a and 318b in order to connect components that are mounted and/or coupled to the circuit board 304. Similarly, with reference to the computing device 400 discussed above with reference to FIGS. 4A and 4B, the cabling subsystem 410 may be connected to the cabling connectors 412a and 412b in order to connect the riser card 406 to components that are mounted and/or coupled to the circuit board 304, the cabling subsystem 422 may be connected to the cabling connectors 420a and 420b in order to connect the riser card 406 to components that are mounted and/or coupled to the circuit board 304, and the cabling subsystem 426 may be connected to the cabling connectors 428a and 428b in order to connect the heat producing component 408 to the circuit board 404 via the riser card 406.

However, while the coupling of specific cabling subsystems to connectors and heat producing components in computing devices has been described, one of skill in the art in possession of the present disclosure will appreciate that cabling subsystems may be provided in computing devices in a variety of manners that will fall within the scope of the present disclosure as well. Furthermore, while the cabling subsystems are described herein as being connected to connectors in the computing device prior to the positioning of those cabling subsystems in the computing device such that their cabling airflow routing portion(s) are oriented in an airflow path adjacent heat producing component(s) in the computing device, one of skill in the art in possession of the present disclosure will appreciate that the connection of the cabling subsystems to connectors in the computing device and the positioning of those cabling subsystem in the computing device may be performed in a different order (e.g., positioning the cabling subsystems in the computing device prior to connecting them to connectors in the computing device) and/or at the same time (e.g., connecting a cabling subsystem to a first connector in the computing device, positioning that cabling subsystem in the computing device, and then connecting that cabling subsystem to a second connector in the computing device) while remaining within the scope of the present disclosure as well.

The method 500 then proceeds to block 504 where the ribbon cable(s) are positioned in the chassis such that cabling airflow routing portion(s) on the ribbon cable(s) are oriented in an airflow path adjacent heat producing component(s). In an embodiment, at block 504, the computing device implementing the cabling-based airflow routing system of the present disclosure may have its cabling subsystems oriented to direct airflow(s) towards heat producing components. For example, with reference to the computing device 200 discussed above with reference to FIGS. 2A and 2B, the ribbon cable 214 in the cabling subsystem 210 may be positioned in the configuration illustrated in FIG. 2A in order to orient the cabling airflow routing portion 214a of the ribbon cable 214 between the cooling system 216 and the heat producing component 210 in a manner that is configured to direct an airflow produced by the cooling system 216 towards the heat producing component 210.

Similarly, with reference to the computing device 300 discussed above with reference to FIGS. 3A and 3B, the ribbon cable 314 in the cabling subsystem 310 may be positioned in the configuration illustrated in FIG. 3A in order to orient the cabling airflow routing portion 314a of the ribbon cable 314 between the cooling system 322 and the heat producing component 306 in a manner that is configured to direct an airflow produced by the cooling system 322 towards the heat producing component 306, and orient the cabling airflow routing portion 314b of the ribbon cable 314 between the cooling system 322 and the heat producing component 308 in a manner that is configured to direct an airflow produced by the cooling system 322 towards the heat producing component 308. In addition, the ribbon cable 320 in the cabling subsystem 316 may be positioned in the configuration illustrated in FIG. 3A in order to orient the cabling airflow routing portion 320a of the ribbon cable 320 between the cooling system 322 and the heat producing component 308 in a manner that is configured to direct an airflow produced by the cooling system 322 towards the heat producing component 308.

Similarly, with reference to the computing device 400 discussed above with reference to FIGS. 4A and 4B, the ribbon cable 414 in the cabling subsystem 410 may be positioned in the configuration illustrated in FIG. 4A in order to orient the cabling airflow routing portion 416 of the ribbon cable 414 between the cooling system 432 and the heat producing component 408 in a manner that is configured to direct an airflow produced by the cooling system 432 towards the heat producing component 408. Furthermore, the ribbon cable 422 in the cabling subsystem 418 may be positioned in the configuration illustrated in FIG. 4A in order to orient the cabling airflow routing portion 424 of the ribbon cable 422 between the cooling system 432 and the heat producing component 408 in a manner that is configured to direct an airflow produced by the cooling system 432 towards the heat producing component 408. Further still, the ribbon cable 430 in the cabling subsystem 426 may be positioned in the configuration illustrated in FIG. 4A in order to orient the cabling airflow routing portion 430a of the ribbon cable 430 between the heat producing component 408 and an airflow exit (not illustrated) defined by the chassis 402 in a manner that is configured to direct an airflow produced by the cooling system 432 and directed past the heat producing component 408 out of the chassis 402.

However, while the coupling of configuration of cabling subsystems and orientation of ribbon cables in those cabling subsystems in computing devices has been described, one of skill in the art in possession of the present disclosure will appreciate that cabling subsystems may be provided in computing devices in a variety of manners that will fall within the scope of the present disclosure as well. For example, airflow requirements for the heat producing component(s), thermal requirements for the computing device, and/or other airflow related configurations may be determined that dictate how an airflow provided in the computing device should be directed, and the ribbon cable(s) in the cabling subsystems utilized with the computing device may then be manufactured and/or oriented in a manner that directs the available airflow in a manner that satisfies the airflow requirements. In some embodiments, ribbon cable(s) in the cabling subsystems may be designed to be provided in one or more orientations that provide their cabling airflow routing portions in different configurations that will redirect airflow in desired manners. As such, one of skill in the art in possession of the present disclosure will appreciate that the blocks 502 and 504 of the method 500 may be performed during the manufacture of the computing device, or may be performed to modify cabling subsystem configurations when airflow requirements in a computing device change (e.g., due to the provisioning or removal of heat producing components from that computing device), while remaining within the scope of the present disclosure as well.

Figure 6:
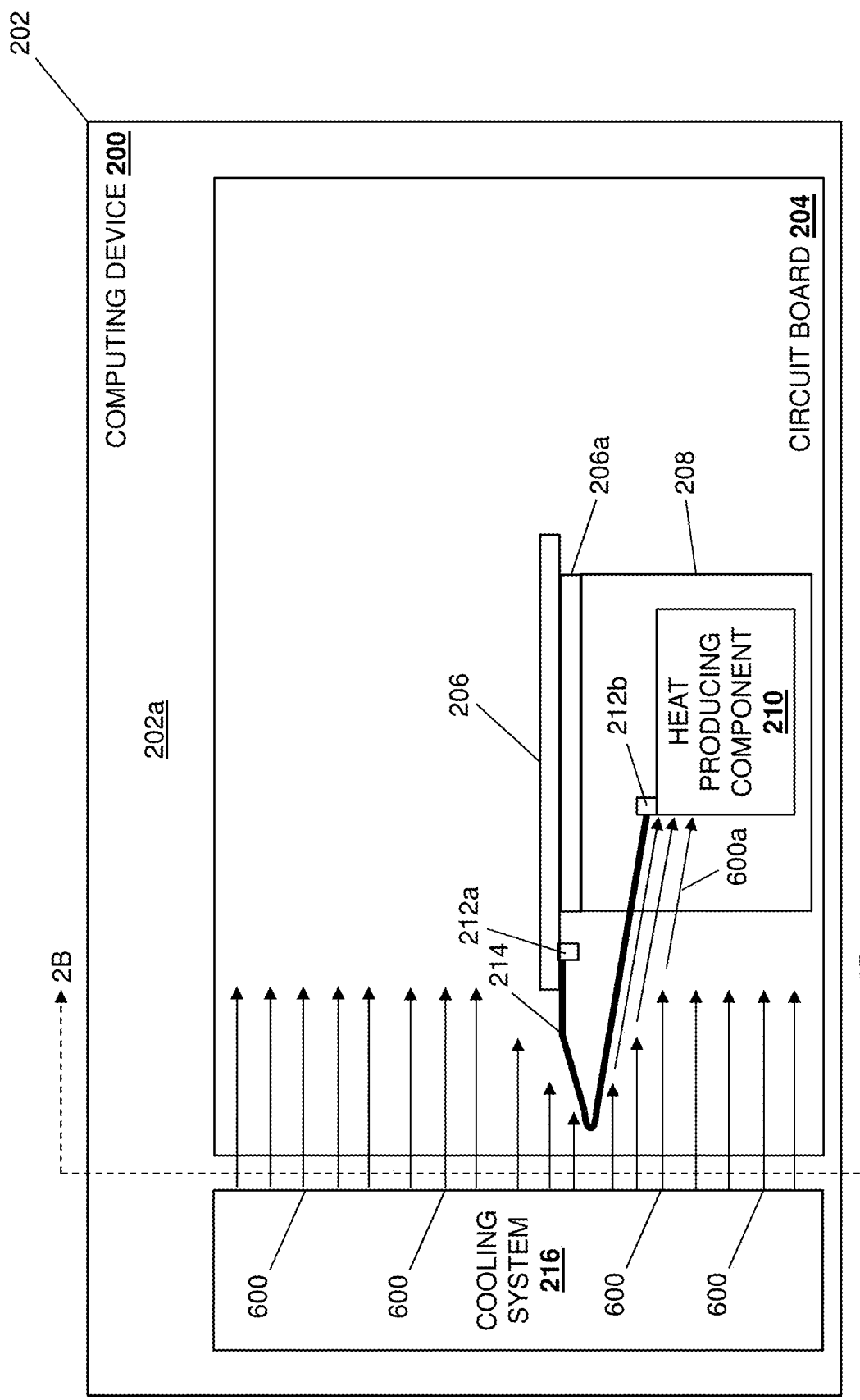
FIG. 6 is a top schematic view illustrating an embodiment of the cabling-based airflow routing system operating in the computing device of FIGS. 2A and 2B.

The method 500 then proceeds to block 506 where the cabling airflow routing portion(s) on the ribbon cable(s) redirect portion(s) of an airflow provided in the airflow path. In an embodiment, at block 506, an airflow may be provided in an airflow path through the chassis housing of a chassis. While in the examples below the airflow is provided by a cooling system in the chassis, one of skill in the art in possession of the present disclosure will appreciate that airflows may be provided by cooling systems outside the chassis, or in a variety of other manners that will fall within the scope of the present disclosure as well. With reference to FIG. 6, at block 506, the cooling system 216 may generate an airflow 600 that is illustrated as being directed along an airflow path from left to right in FIG. 6 and, as illustrated in FIG. 6, a portion 600a of that airflow 600 will be redirected by the cabling airflow routing portion 214a of the ribbon cable 214 on the cabling subsystem 210 and towards the heat producing component 210. As such, the cabling subsystem 210 operates to redirect the airflow 600 provided along an airflow path in the chassis housing 202a towards the heat producing component 210, which one of skill in the art in possession of the present disclosure may be configured to satisfy the airflow/thermal requirements for the heat producing component 210, the computing device 200, and/or other components in the computing device 200.

Figure 7:
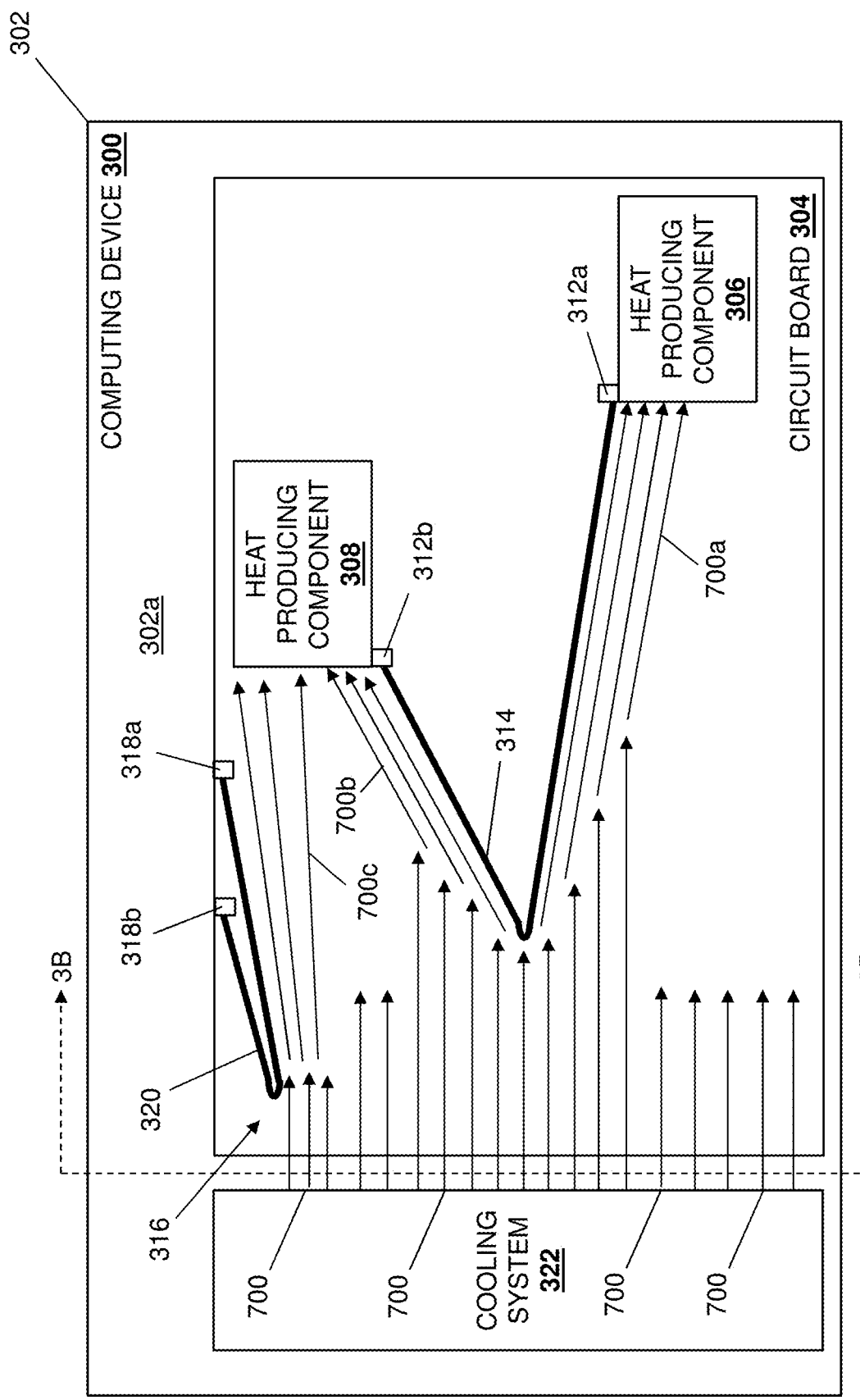
FIG. 7 is a top schematic view illustrating an embodiment of the cabling-based airflow routing system operating in the computing device of FIGS. 3A and 3B.

Similarly, with reference to FIG. 7, at block 506, the cooling system 322 may generate an airflow 700 that is illustrated as being directed along an airflow path from left to right in FIG. 7 and, as illustrated in FIG. 7, a portion 700a of that airflow 700 will be redirected by the cabling airflow routing portion 314a of the ribbon cable 314 on the cabling subsystem 310 and towards the heat producing component 306, a portion 700b of that airflow 700 will be redirected by the cabling airflow routing portion 314b of the ribbon cable 314 on the cabling subsystem 310 and towards the heat producing component 308, and a portion 700c of that airflow 700 will be redirected by the cabling airflow routing portion 320a of the ribbon cable 320 on the cabling subsystem 316 and towards the heat producing component 308. As such, the cabling subsystems 310 and 316 operate to redirect the airflow 700 provided along an airflow path in the chassis housing 302a towards the heat producing components 306 and 308, which one of skill in the art in possession of the present disclosure may be configured to satisfy the airflow/thermal requirements for the heat producing components 306 and 308, the computing device 300, and/or other components in the computing device 300.

Figure 8:
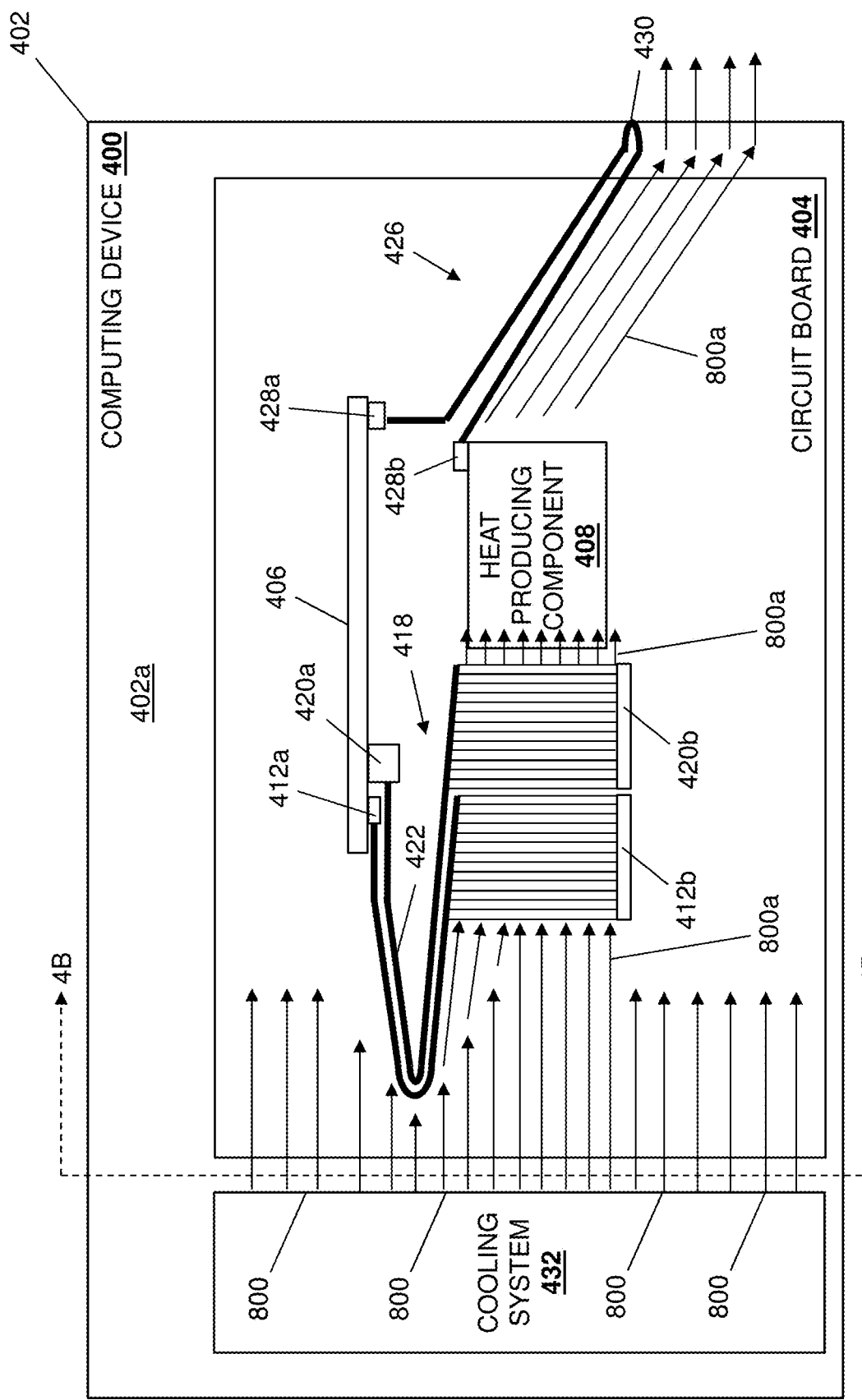
FIG. 8 is a top schematic view illustrating an embodiment of the cabling-based airflow routing system operating in the computing device of FIGS. 4A and 4B.

Similarly, with reference to FIG. 8, at block 506, the cooling system 432 may generate an airflow 800 that is illustrated as being directed along an airflow path from left to right in FIG. 8 and, as illustrated in FIG. 8, a portion 800a of that airflow 800 will be redirected by the cabling airflow routing portions 416 and 424 of the ribbon cables 414 and 422 on the cabling subsystems 410 and 418 and towards the heat producing component 408 and, in particular, by the airflow routing wall 416a on the cabling airflow routing portion 416 of the ribbon cable 414 and through the airflow tunnels provided by the cabling airflow routing portions 416 and 424 of the ribbon cables 414 and 422. Furthermore, as also illustrated in FIG. 8, the portion 800a of that airflow 800 that passes the heat producing component 408 will be redirected by the cabling airflow routing portion 430a of the ribbon cable 430 on the cabling subsystem 426 and out of the chassis housing 402a (e.g., via airflow exit apertures defined by the chassis 402, not illustrated). As such, the cabling subsystems 410 and 418 operate to redirect the airflow 800 provided along an airflow path in the chassis housing 402a towards the heat producing component 408, while the cabling subsystem 426 operates to redirect the airflow 800 that passes the heat producing component 408 out of the chassis 402, which one of skill in the art in possession of the present disclosure may be configured to satisfy the airflow/thermal requirements for the heat producing component 408, the computing device 400, and/or other components in the computing device 400.

Figure 9:
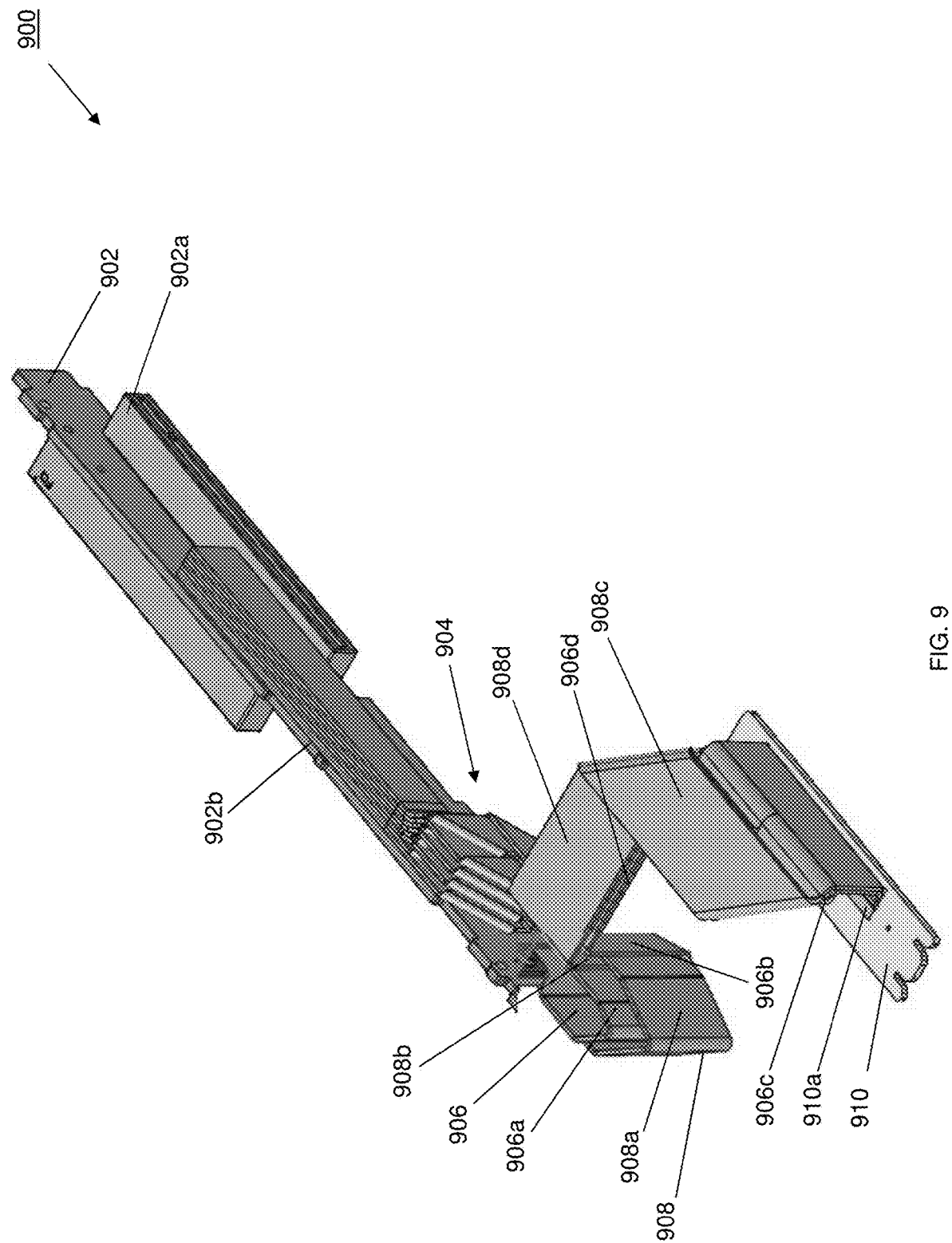
FIG. 9 is a perspective view illustrating an experimental embodiment of a cabling-based airflow routing system.

With reference to FIG. 9, an experimental embodiment of a cabling-based airflow routing system 900 is illustrated. In the illustrated embodiment, the cabling-based airflow routing system 900 includes a riser card 902 having an add-in card connector 902a that may be configured to connect to add-in cards like those described above, and one or more cabling subsystem connectors 902b. A plurality of cabling subsystems 904 are connected to the cabling subsystem connectors 902b on the riser card 902, and include a ribbon cable 906 and a ribbon cable 908. As can be seen in FIG. 9, the ribbon cable 906 has been positioned such that a cabling airflow routing portion 906a of the ribbon cable 906 is oriented to direct a portion of an airflow provided along an airflow path through an airflow tunnel that is defined by a pair of side walls 906b and 906c that are provided by the ribbon cable 906 and connected via a top wall 906d provided by the ribbon cable 906. Similarly, the ribbon cable 908 has been positioned such that a cabling airflow routing portion 908a of the ribbon cable 908 is oriented to direct a portion of an airflow provided along an airflow path through an airflow tunnel that is defined by a pair of side walls 908b and 908c that are provided by the ribbon cable 908 and connected via a top wall 908d provided by the ribbon cable 908. The cabling-based airflow routing system 900 also includes a circuit board 910 having one or more cabling subsystem connectors 910a, and each of the ribbon cables 908 and 910 are connected to the cabling subsystem connector(s) 910a. As will be appreciated by one of skill in the art in possession of the present disclosure, the portion(s) of the airflow provided along the airflow path and redirected by the ribbon cables 906 and 908 via the airflow tunnels may pass by heat producing component(s) included on an add-in card that is connected to the add-in card connector 902a.

Thus, systems and methods have been described that provide for the routing of airflows through a chassis housing and to heat producing component(s) housed in the chassis using ribbon cable(s) that extend through the chassis housing and that are oriented such that cabling airflow routing portion(s) of the ribbon cable(s) redirect portion(s) of airflows provided on an airflow path towards the heat producing component(s). For example, the cabling-based airflow routing system of the present disclosure may include a chassis that defines a chassis housing, a first heat producing component that is located in the chassis housing, a first cabling connector that is located in the chassis housing, and a second cabling connector that is located in the chassis housing. A first ribbon cable extends through the chassis housing between the first cabling connector and the second cabling connector, and includes a first cabling airflow routing portion that is oriented in the chassis housing in an airflow path and that is configured to redirect a first portion of an airflow provided in the airflow path towards the first heat producing component. As such, the cabling subsystems utilized to connect components in a computing device may be utilized to route airflows, allowing airflow routing within the computing device to be adjusted and/or modified quickly and easily when needed, and eliminating the issues associated with conventional air duct systems when airflow requirements in the computing device change.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cabling-based airflow routing system, comprising:
a chassis that defines a chassis housing;
a first heat producing component that is located in the chassis housing;
a first cabling connector that is located in the chassis housing;
a second cabling connector that is located in the chassis housing; and
a first ribbon cable that extends through the chassis housing between the first cabling connector and the second cabling connector, wherein the first ribbon cable includes a first cabling airflow routing portion that is oriented in the chassis housing in an airflow path and that is configured to redirect a first portion of an airflow provided in the airflow path towards the first heat producing component.

2. The system of claim 1, wherein at least one of the first cabling connector and the second cabling connector is included on the first heat producing component.

3. The system of claim 1, further comprising:
a cooling system included in the chassis housing, wherein the first cabling airflow routing portion of the first ribbon cable is located between the cooling system and the first heat producing component and configured to direct the first portion of the airflow received from the cooling system towards the first heat producing component.

4. The system of claim 1, further comprising:
a third cabling connector that is located in the chassis housing;
a fourth cabling connector that is located in the chassis housing;
a second ribbon cable that extends through the chassis housing between the third cabling connector and the fourth cabling connector, wherein the second ribbon cable includes a second cabling airflow routing portion that is oriented in the chassis housing in the airflow path and that is configured to redirect the first portion of the airflow that has passed the first heat producing component out of the chassis.

5. The system of claim 1, wherein the first cabling airflow routing portion of the first ribbon cable is formed into an airflow routing tunnel that includes a pair of substantially parallel side walls connected by a top wall and that is located adjacent the first heat producing component.

6. The system of claim 1, further comprising:
a second heat producing component that is located in the chassis housing, wherein the first ribbon cable includes a second cabling airflow routing portion that is oriented in the chassis housing in the airflow path and that is configured to redirect a second portion of the airflow provided in the airflow path towards the second heat producing component.

7. An Information Handling System (IHS), comprising:
a chassis;
a processing system that is housed in the chassis;
a memory system that is housing in the chassis, that is coupled to the processing system, and that includes instructions that, when executed by the processing system, cause the processing system to perform at least one computing operation; and
a first ribbon cable that extends through the chassis, wherein the first ribbon cable includes a first cabling airflow routing portion that is oriented in the chassis in an airflow path and that is configured to redirect a first portion of an airflow provided in the airflow path towards the processing system.

8. The IHS of claim 7, wherein the first ribbon cable is coupled via a connector to the processing system.

9. The IHS of claim 7, further comprising:
a cooling system included in the chassis, wherein the first cabling airflow routing portion of the first ribbon cable is located between the cooling system and the processing system and configured to direct the first portion of the airflow received from the cooling system towards the processing system.

10. The IHS of claim 7, further comprising:
a second ribbon cable that extends through the chassis, wherein the second ribbon cable includes a second cabling airflow routing portion that is oriented in the chassis housing in the airflow path and that is configured to redirect the first portion of the airflow that has passed the processing system out of the chassis.

11. The IHS of claim 7, wherein the first cabling airflow routing portion of the first ribbon cable is formed into an airflow routing tunnel that includes a pair of substantially parallel side walls connected by a top wall and that is located adjacent the processing system.

12. The IHS of claim 7, further comprising:
a heat producing component that is located in the chassis, wherein the first ribbon cable includes a second cabling airflow routing portion that is oriented in the chassis housing in the airflow path and that is configured to redirect a second portion of the airflow provided in the airflow path towards the heat producing component.

13. The IHS of claim 7, further comprising:
at least one circuit board included in the chassis; and
a pair of connectors included on the at least one circuit board, wherein the first ribbon cable is connected to each of the pair of connectors.

14. A method for routing airflow using cabling, comprising:
connecting a first ribbon cable to a pair of first connectors in a chassis that houses a first heat producing component;
positioning, in the chassis, the first ribbon cable such that a first cabling airflow routing portion on the first ribbon cable is oriented in the chassis in an airflow path adjacent the first heat producing component; and
redirecting, by the first cabling airflow routing portion on the first ribbon cable, a first portion of an airflow provided in the airflow path towards the first heat producing component.

15. The method of claim 14, wherein at least one of the pair of first connectors is included on the first heat producing component.

16. The method of claim 14, further comprising:
generating, by a cooling system included in the chassis, the airflow provided in the airflow path.

17. The method of claim 14, further comprising:
connecting a second ribbon cable to a pair of second connectors in the chassis that houses the first heat producing component;
positioning, in the chassis, the second ribbon cable such that a second cabling airflow routing portion on the second ribbon cable is oriented in the chassis in the airflow path adjacent the first heat producing component; and
redirecting, by the second cabling airflow routing portion on the second ribbon cable, the first portion of the airflow that has passed the first heat producing component out of the chassis.

18. The method of claim 14, wherein the first cabling airflow routing portion of the first ribbon cable is formed into an airflow routing tunnel that includes a pair of substantially parallel side walls connected by a top wall and that is located adjacent the first heat producing component.

19. The method of claim 14, further comprising:
positioning, in the chassis, the first ribbon cable such that a second cabling airflow routing portion on the first ribbon cable is oriented in the chassis in the airflow path adjacent a second heat producing component; and
redirecting, by the second cabling airflow routing portion on the first ribbon cable, a second portion of the airflow provided in the airflow path towards the second heat producing component.

20. The method of claim 14, wherein the pair of first connectors are included on at least one circuit board in the chassis.

\* \* \* \* \*